March 2, 1926.
A. PAINTER
BAGGAGE CARRIER FOR AUTOMOBILES
Filed May 29, 1924
1,575,225
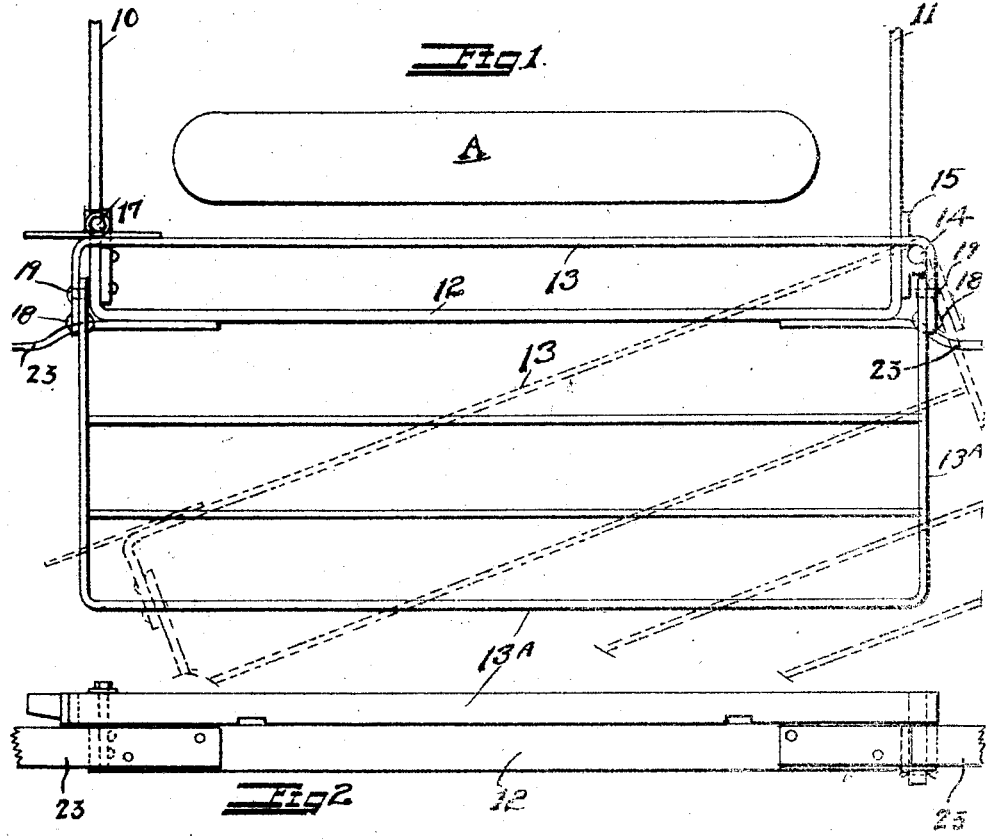
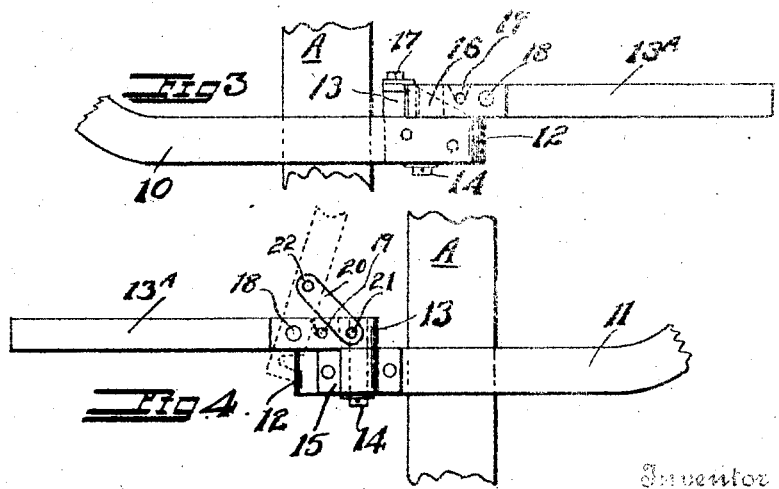
Inventor
Arthur Painter Patented Mar. 2, 1926.

1,575,225

UNITED STATES PATENT OFFICE.

ARTHUR PAINTER, OF BERKELEY, CALIFORNIA.

BAGGAGE CARRIER FOR AUTOMOBILES.

Application filed May 29, 1924. Serial No. 716,683.

*To all whom it may concern:*

Be it known that I, ARTHUR PAINTER, a citizen of the United States, residing in Berkeley, in the county of Alameda and State of California, have invented a new and useful Baggage Carrier for Automobiles, of which the following is a specification.

The object of this invention is to provide a device of this character which may be readily attached to the back of an automobile to carry baggage which can be quickly and easily removed without disturbing the baggage. More specifically the device comprises a rack pivoted on a vertical axis so that it can be swung outward in a horizontal plane, thereby removing the rack from its position in front of the extra tire and leaving the same freely accessible. A further object is to provide a rack that will be out of the way when not in use, and to accomplish this, part of the rack is pivoted on a horizontal axis so that it is adapted to swing downwardly into the baggage holding position and to tilt upwardly to stand adjacent to the back of the automobile when not in use. Other objects are to construct a device with locking and holding means to positively secure the rack in its position and prevent loss of baggage, etc.

I attain these objects by the mechanism illustrated in the accompanying drawings in which:

Figure 1 is a plan view of the device, dotted lines showing rack swung outward.

Figure 2 is a front elevation of the device.

Figure 3 is a side elevation of the device showing locking means.

Figure 4 is a side elevation showing vertical pivot.

Similar numerals refer to similar parts throughout the several views.

The numerals 10 and 11 indicate arms rigidly attached to any suitable part of the automobile, and 12 is a cross-bar fastened to the arms (to distribute the load). The rack is designated by 13 and is secured to vertical pin 14 which fits into bearing 15 secured to the arm 11. This arrangement supports the rack allowing it to be swung outward in a horizontal plane. The frame 12 can be provided with the arms 23 to make a bumper.

On the arm 10 is fastened the piece 16 which projects above the arm and has a slot open at the top in which the rear of the rack 13 is secured. This prevents the rack from swinging outward and also holds part of the weight of the baggage when rack is in use. To prevent the rack from raising out of the slot and getting loose a screw 17 is used in piece 16 which extends over top of the rack. To release the rack the screw has to be removed and the rack raised out of the slot which can be easily done, as pivot is free enough, together with spring in frame, to allow for this. Part of the rack 13^A is pivoted on the horizontal axis at 18, and to hold it securely in the baggage carrying position, the pins 19 fastened to 13 are provided and control its downward movement. The dotted lines in Figure 4 show the rack tilted up when not in use, and it can be held when in this position by using bolts for the parts which can be made sufficiently tight for the purpose. To further secure it in its upright position a latch piece 20 shown in Figure 4 can be used. This latch is pivoted to 13 at 21 and engages the pin 22 on 13^A. The pin 22 or pivot 21 can be a screw or the latch made so as to spring over the pin.

The operation and mode of construction of the device is very simple and will be clear from foregoing descriptions, but it is understood however that I do not expect to limit myself to the specific forms shown and described herein.

A indicates the position of the extra tire on the automobile in relation to the rack.

I claim;

1. A baggage carrier for automobiles comprising carrier arms attached to said automobile and a rack pivotally mounted on a vertical axis upon one of said carrier arms so that said rack can be swung outwardly, said rack comprising a horizontally pivoted part adapted to swing downwardly into baggage holding position and to tilt upwardly to stand adjacent to the rear end of the automobile when not in use and means for securing said part of rack when in baggage holding position.

2. A baggage carrier for automobiles comprising a carrier frame attached to said automobile said carrier frame comprising lateral arms, and a cross arm fastened to said lateral arms, a rack pivotally mounted on a vertical axis upon one end of said carrier frame so that said rack can be swung outwardly, and means to secure said rack in baggage carrying position.

3. A baggage carrier for automobiles comprising a carrier frame attached to said automobile, said carrier frame comprising lateral arms and a cross arm fastened to said lateral arms, a rack pivotally mounted on a vertical axis upon one end of said carrier frame so that rack can be swung outwardly, said rack comprising a horizontally pivoted part adapted to swing downwardly into baggage holding position and to tilt upwardly to stand adjacent to rear end of vehicle when not in use and means for securing said part of rack in baggage holding position.

4. A baggage carrier for automobiles comprising carrier arms attached to said automobile and a rack pivotally mounted on a vertical axis upon one of said carrier arms, means to secure said rack in baggage carrying position and permitting it to be swung outwardly when released, said rack comprising a horizontally pivoted part adapted to swing downwardly into baggage holding position and to tilt upwardly to stand adjacent to the rear end of the automobile when not in use, and means for securing said part of rack when in baggage holding position.

5. A baggage carrier for automobiles comprising a carrier frame attached to said automobile, said carrier frame comprising lateral arms and a cross arm fastened to said lateral arms, a rack pivotally mounted on a vertical axis upon one end of said carrier frame, means to secure said rack in baggage carrying position and permitting it to be swung outwardly when released, said rack comprising a horizontally pivoted part adapted to swing downwardly into baggage holding position and to tilt upwardly to stand adjacent to the rear end of the automobile when not in use, and means for securing said part of rack when in baggage holding position.

ARTHUR PAINTER.